(12) United States Patent
Wilson-Rich (10) Patent No.: US 10,721,919 B2
(45) Date of Patent: Jul. 28, 2020

(54) SMART BEEHIVE SYSTEM AND METHOD OF OPERATING THE SAME

(71) Applicant: Best Bees Company, Boston, MA (US)

(72) Inventor: Noah Wilson-Rich, Boston, MA (US)

(73) Assignee: BEST BEES COMPANY, Boston, MA (US)

( * ) Notice: Subject to any disclaimer, the term of this patent is extended or adjusted under 35 U.S.C. 154(b) by 357 days.

(21) Appl. No.: 15/625,514

(22) Filed: Jun. 16, 2017

(65) Prior Publication Data

US 2017/0360010 A1 Dec. 21, 2017

Related U.S. Application Data

(60) Provisional application No. 62/350,998, filed on Jun. 16, 2016.

(51) Int. Cl.
| | | |
|---|---|---|
| A01K 47/06 | (2006.01) | |
| A01K 51/00 | (2006.01) | |
| H01J 49/42 | (2006.01) | |
| H04Q 9/02 | (2006.01) | |
| G08B 23/00 | (2006.01) | |
| G08B 13/196 | (2006.01) | |
| G08B 21/18 | (2006.01) | |
| G08B 25/10 | (2006.01) | |

(52) U.S. Cl.
CPC .......... *A01K 47/06* (2013.01); *A01K 51/00* (2013.01); *G08B 13/19613* (2013.01); *G08B 21/182* (2013.01); *G08B 23/00* (2013.01); *G08B 25/10* (2013.01); *H01J 49/4205* (2013.01); *H04Q 9/02* (2013.01); *H04Q 2209/25* (2013.01); *H04Q 2209/82* (2013.01); *H04Q 2209/84* (2013.01); *H04Q 2209/88* (2013.01)

(58) Field of Classification Search
CPC .............................. A01K 47/06; A01K 51/00
USPC .............................................. 449/1–4, 6, 12
See application file for complete search history.

(56) References Cited

U.S. PATENT DOCUMENTS

| | | | | |
|---|---|---|---|---|
| 6,910,941 | B2 * | 6/2005 | Bromenshenk | A01K 15/02 |
| | | | | 449/20 |
| 9,807,985 | B2 * | 11/2017 | Bulanyy | A01K 47/06 |
| 10,064,395 | B2 * | 9/2018 | Chapa | A01K 47/06 |
| 2010/0062683 | A1 * | 3/2010 | Brundage | A01K 47/06 |
| | | | | 449/1 |
| 2014/0212520 | A1 * | 7/2014 | Del Vecchio | A01K 51/00 |
| | | | | 424/744 |
| 2015/0084784 | A1 * | 3/2015 | Suta | H04Q 9/02 |
| | | | | 340/870.01 |
| 2016/0212976 | A1 * | 7/2016 | Bulanyy | A01K 47/06 |

(Continued)

FOREIGN PATENT DOCUMENTS

CN 203575331 U * 5/2014 ............ A01K 51/00

*Primary Examiner* — David J Parsley
*Assistant Examiner* — Danielle A Clerkley (57) ABSTRACT

A beehive system includes a processing system for monitoring and controlling a beehive. The beehive can include a bottom board, one or more boxes, and an outer cover. The one or more boxes can contain bees and bee materials, as well as various components and sensors for monitoring and controlling conditions in the beehive. The beehive can include one or more sensors for monitoring a corresponding one or more conditions inside the beehive, and one or more control elements for manipulating the one or more conditions inside the beehive.

18 Claims, 6 Drawing Sheets

(56) References Cited

U.S. PATENT DOCUMENTS

2017/0208780 A1\* 7/2017 Collins ................ A01K 53/00
2017/0360010 A1\* 12/2017 Wilson-Rich .......... A01K 47/06

\* cited by examiner

SMART BEEHIVE SYSTEM AND METHOD OF OPERATING THE SAME

PRIORITY

This application claims priority to Provisional Application 62/350,998, filed Jun. 16, 2016, all of which is herein incorporated by reference.

BACKGROUND

1. Technical Field

The present disclosure relates to beehives, and more particularly, to a smart beehive system and method of operating the same.

2. Introduction

Honey bees (*Apis mellifera*) are of vital importance to both a region's ecology as well as its economy. As pollinators of over 70 fruit and vegetable crops, honey bees can contribute over $15 billion annually to the U.S. economy. Honey bees are a significant part of the U.S. agricultural economy, much beyond their value as pollinators. Indeed, wax, honey, and the bees themselves are the crux of several large, interacting markets.

Yet, these important pollinators are dying. In fact, bees are dying in numbers larger than ever before, and the U.S. agricultural system is intrinsically intertwined with their survival. The increasing mortality rate in honeybees costs the U.S. economy millions of dollars every year.

The causes of death of bees are varied and often complicated. Thus, beekeepers need to be able to quickly and efficiently address a large number of concerns where time is literally a matter of life or death. Unfortunately, currently state of the art of beekeeping is often rudimentary, and generally involves keeping bees in a wooden box, and periodically observing the bees. All too often, bees are simply maintained on the backs of semi-trucks and shipped around the country with little to no attention.

SUMMARY

Disclosed herein is a new beehive configuration that includes multiple interlocking parts. The new beehive can include electronics that can operate through a processing system hidden in an upper top or outer cover, outside the beehive, or in any location associated with the beehive. A beehive set can include a bottom board, one or more boxes, and an outer cover. The system can be powered by solar panels. The solar panels can be tilted to catch the maximum amount of sunlight daily. The peaked top cover can also serve to hold the majority of the computing system and hardware. A battery bank, ion trap mass spectrometer, computing system, wireless receiver and transmitter, dehumidifier, one or more sensors, and/or one or more treatment reservoirs can be located proximate the top between the peaked roof. Other configurations can include more or less items and position the components in various containers around the beehive.

In some examples, the beehive can include multiple boxes. Each box can contain heating elements, a ventilation fan, interior sensors (e.g., temperature and humidity sensors), exterior sensors, and/or other sensors, such as pressure sensors, among the boxes. The boxes can have automated ventilation flaps which could be opened and closed as needed or in response to environmental stressors as programmed.

The temperature, airflow, and humidity levels inside of the beehive year round can be important to the survival of a colony of bees kept in the beehive. Giving beekeepers the ability to be able to monitor and keep the beehive at a certain temperature, humidity, and rates of ventilation with telemetry data can, in some instances, increase survival chances. With controllable ventilation flaps, the beekeeper can also lock down the beehive in case of pesticides being sprayed. One capability disclosed herein is an automatic beehive lock-down functionality which locks down the beehive in presence of pesticides for a set period, keeping infected bees out of the beehive, and notifying the beekeeper in a variety of specific conditions.

Also disclosed is an Internet-based remote monitoring and control system in which one or more beehives can be remotely monitored and controlled so as to improve the capability of respective beehives to be maintain good health for the bees. Individual respective beehives can communicate data and receive data over cellular, BlueTooth, WiFi, Near Field, wired, or any other communications protocol.

DETAILED DESCRIPTION

The present disclosure addresses the need for smart, efficient, flexible, and effective beehives and beekeeping technologies. Disclosed herein is a "Smart" beehive that can monitor and control health parameters and environmental conditions in a beehive. The smart beehive can include electronics that can run through a processing system in an upper top or outer cover of the beehive or elsewhere in relation to the beehive. The beehive can include a bottom board, one or more boxes, and an outer cover. The one or more boxes can contain bees and bee materials, as well as various components and sensors for monitoring and controlling conditions in the beehive. The beehive can include a computing system, a battery bank, an ion trap mass spectrometer, a wireless receiver and transmitter, a dehumidifier, a heating element, a fan, a ventilation flap, a camera, a screen, one or more treatment reservoirs, sprays, and one or more sensors. The beehive could also communicate via a wired connection. The one or more sensors can include a temperature sensor, a humidity sensor, a pressure sensor, an airflow sensor, a heat sensor, and/or a particle sensor. The sensors can be contained inside the one or more boxes and/or outside of the beehive.

The smart beehive can automatically respond to threats to the beehive, such as pesticides being sprayed in a nearby field, and conditions in the beehive, such as environmental conditions. The beehive can administer disease treatments remotely or automatically, and maintain the internal conditions that are optimal for bee health, while minimizing those conditions conducive to bee diseases. In many cases, billions of dollars are spent every year trying to keep a dwindling population of bees alive to provide the U.S. with food. The beehive herein can provide a means to better sustain and grow the bee population, using technology guided by bee biology.

A respective beehive can also be in communication with a remote monitoring and control station that can have real-time data about the conditions in the beehive and make automatic or manual decisions to perform any number of actions. The system can also make predictive decisions based on machine learning techniques when evaluating data. For example, if under certain circumstances, the system learns that pesticides will be spread around the beehive, the system can pre-emptively shut down the ventilation before a sensor would need to detect the pesticides.

The disclosed beehive addresses various underlying issues associated with beekeeping, such as to increase the survival rate of bees, and/or increase their level of productivity. Beyond beekeeping for agricultural purposes, the beehive system can gather data which can be used to better understand and improve health conditions of bees. The beehive can have various hardware components and configurations which can be tailored for each beehive according to the specific wants and needs of a user.

Various embodiments of the disclosure are described in detail below. While specific implementations are described, it should be understood that this is done for illustration purposes only. Other components and configurations may be used without parting from the spirit and scope of the disclosure. Moreover, it should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

Figure 1:
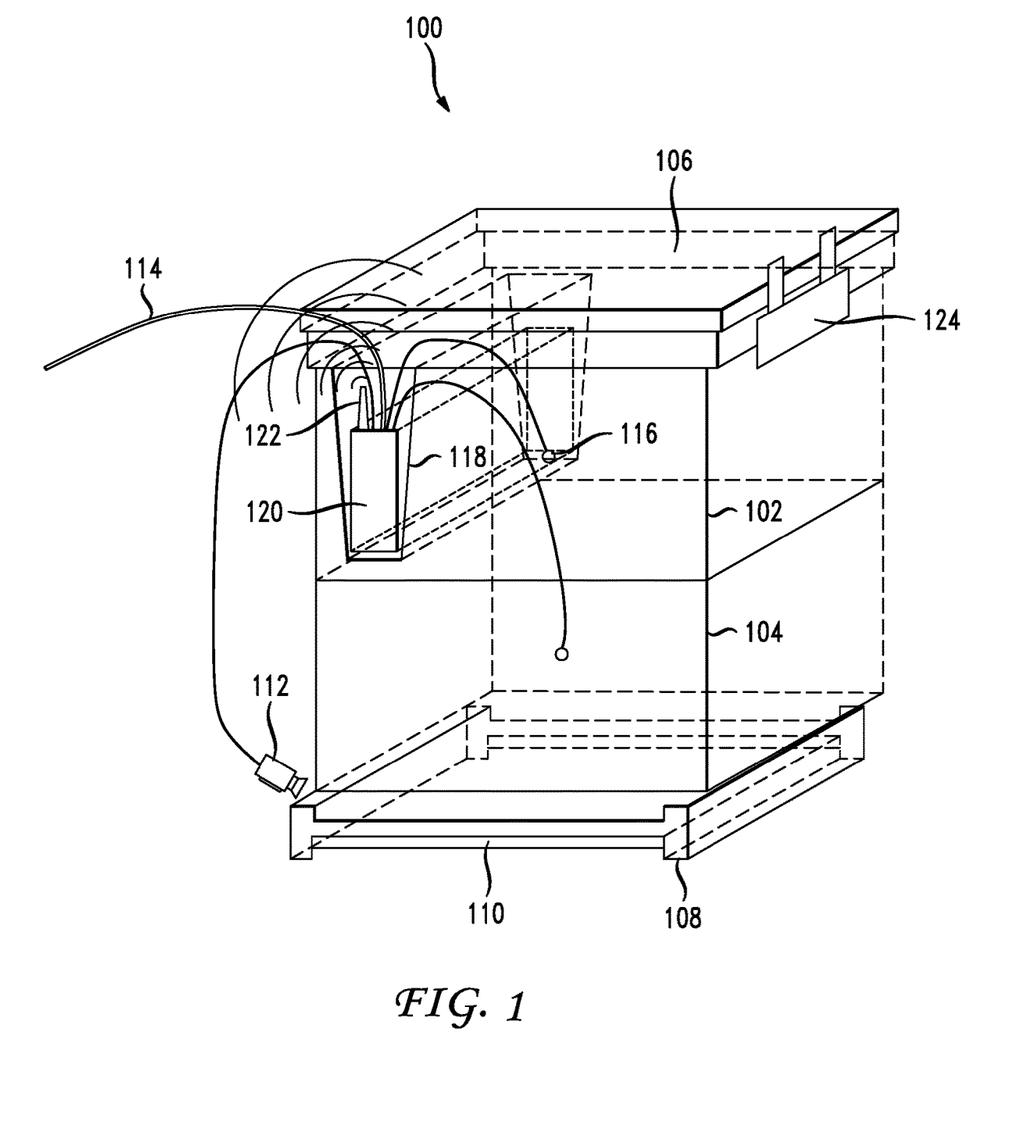
FIG. 1 illustrates an example smart beehive according to some embodiments.

FIG. 1 illustrates a smart beehive 100 according to some embodiments. The beehive 100 can include boxes 102, 104, which can contain bees, bee colonies, honey, honeycomb, and the like. The boxes 102, 104 can form interconnected or disconnected enclosures for bees. The beehive 100 can also include a cover 106 over the box 102, which encloses the contents of the box 102. The cover 106 can prevent the bees in boxes 102, 104 from escaping, and outside objects, such as bugs, from entering the beehive 100. As will be further described below, the cover 106 can also include various components, such as electrical components, which can be integrated into the beehive 100.

Furthermore, the box 102 can include a container 118 for housing electrical components, such as a computing system 120 and a receiver/transmitter interface (e.g., access point) 122 implemented in the beehive 100. While the container 118 is illustrated as a receptacle, other mechanisms for integrating electrical components are contemplated herein. For example, electrical components can be integrated via any housing mechanism, any attachment mechanism, any coupling mechanism, any placement mechanism, any containment mechanism, and so forth.

The computing system 120 can be any computing device, such as a laptop computer, a tablet computer, a kiosk, a desktop computer, a smartphone, a server, embedded controller, field programmable gate array (FPGA), application specific integrated controller (ASIC), discrete circuitry, and the like. Moreover, the receiver/transmitter interface 122 can include a network interface card (NIC) configured with wireless capabilities (e.g., WIFI, cellular, BLUETOOTH, WIFI Direct, etc.) and/or wired communication capabilities using wired communication protocols and media (e.g., Ethernet, broadband, fiber optic, twisted pair, TCP/IP, etc.).

The computing system 120 can be communicatively coupled with one or more sensors 116. The sensors 116 can include one or more internal and/or external sensors for detecting various parameters, such as environmental parameters or conditions. For example, the sensors 116 can include sensors placed in the boxes 102, 104 for detecting conditions in the boxes 102, 104, such as temperature, pressure, humidity, air flow, rate of ventilation, air quality and/or composition, water quality and/or composition, movement, object proximity or presence, level of honey, presence of pesticides or other pollutant particles, etc. The system 120 can also sense rates of change of the various parameters, such as how quickly the temperature is dropping or how quickly the humidity is rising. Based on such parameters or data (static or dynamic rates of change data), the system can implement actions. The sensors 116 can be configured to take measurements and report the measurements or data to the computing system 120.

The computing system 120 can be configured to obtain the measurements or data from the sensors 116 to store, analyze, and/or report the measurements, rates of change of any parameter, or data, as well as monitor conditions and respond to conditions or events, such as sending alerts when certain conditions of the beehive changes, sending commands or instructions to manipulate conditions associated with the beehive, and/or other type of signaling mechanism. The computing system 120 can send signals (e.g., commands) or data (e.g., measurements) to remote computing devices, such as computing devices in other beehives, remote servers, remote client devices, etc. The remote sensor can aggregate data received from a plurality of beehives and track trends, issue alerts, use machine learning to predict future events, send out commands to perform various functions, and so forth.

Moreover, the computing system 120 can use the measurements from the sensors 116 to generate alerts, such as threshold environmental conditions (e.g., temperature fluctuation, humidity levels, air flow levels, air quality, etc.), for remote users. Further, the computing system 120 can use the measurements from the sensors 116 to respond to certain conditions or events. For example, the computing system 120 can detect a certain condition in the beehive, such as a threshold temperature or humidity level, or a rate of change of a parameter, and signal other components in the beehive 100 to perform an action to adjust that certain condition. To illustrate, the computing system 120 can control a heating element or a humidifier to adjust a detected temperature or humidity. Various components for controlling the conditions in the beehive 100 are further described below.

The beehive 100 can also include a bottom portion 108. The bottom portion 108 can be, for example, a bottom board.

The bottom portion 108 can provide a bottom cover for the beehive 100. Moreover, the bottom portion 108 can include a weight scale 110 for weighing a weight (e.g., mass) of the beehive 100 (e.g., boxes 102, 104), the contents in the boxes 102, 104, and/or any materials on the bottom portion 108. The data processed can combine and analyze two seemingly unrelated pieces of data. For example, the system can identify the weight of the beehive and also evaluate the temperature. There may be circumstances where the beehive is full of honey and, in that condition, a certain low temperature is unhealthy. The system could in that case be programmed to increase the temperature. The system can correlate various data points to determine whether to take an action.

The beehive 100 can also include a camera 112 for capturing images and/or video associated with the beehive 100. The camera 112 can capture images and/or video of the contents or materials on the bottom portion 108, the contents of any of boxes 102, 104, and/or any area inside or around the beehive 100. The camera 112 can be communicatively coupled with the computing system 120 in order to communicate captured data to the computing system 120. The computing system 120 can obtain, store, analyze, and/or report any of the data (e.g., images, videos, etc.) from the camera 112. For example, the computing system 120 can use the data from the camera 112 to monitor and detect conditions in and/or around the beehive 100. An infrared camera could also be deployed as well, such as for monitoring conditions around the beehive during evening hours.

The beehive 100 can include a connection 114 to a power source for powering the computing system 120 and receiver/transmitter interface 122. For example, the beehive can include a DC power cord for connecting the computing system 120 to a power source or a solar panel that is used to power the computing system 120 and receiver/transmitter interface 122.

In some cases, the receiver/transmitter interface 122 can function as an access point. The receiver/transmitter interface 122 can be configured to broadcast wireless signals to nearby devices. The receiver/transmitter interface 122 can provide network connectivity, including Internet connectivity and/or access to network resources, to nearby devices connected to the receiver/transmitter interface 122. In some cases, the receiver/transmitter interface 122 can be associated with a wireless network. The receiver/transmitter interface 122 can host the wireless network. Nearby devices can connect to the wireless network via the receiver/transmitter interface 122. The wireless network can allow connected devices to access one or more networks and/or network resources, and/or obtain Internet connectivity. For example, the wireless network can allow nearby connected devices to access network resources hosted on the wireless network and/or a local area network that is interconnected to, and accessible via, the wireless network. In some examples, the wireless network can be a WIFI network. The wireless network can be configured to require security credentials for devices to join, such as username, password, passkey, an SSID, a network name, etc. The wireless network can also be configured to encrypt communications via one or more encryption protocols/mechanisms, such as WPA, WEP, etc.

The receiver/transmitter interface 122 can be located inside of the beehive 100 and/or outside of the beehive. Moreover, the receiver/transmitter interface 122 can be interconnected with other components in the beehive, such as the computing system 120 and receiver/transmitter interface 122. Moreover, the receiver/transmitter interface 122 can be part of a larger network and may also interconnect with other access points on other beehives. For example, in an area with multiple beehives, multiple access points implemented with the beehives can form a mesh network to increase the wireless footprint of the access points. Nearby users can then connect to a home access point and maintain connectivity throughout the extended range provided by the mesh network of access points. Thus, the nearby users can connect their devices to an access point on a beehive and roam to an area outside of the range of that access point and nevertheless maintain connectivity, via the mesh network of access points, by performing a handoff that connects the user's device to another access point on another beehive.

In some cases, the receiver/transmitter interface 122 can be configured to provide Internet connectivity to those users who connect to the receiver/transmitter interface 122. Internet connectivity can be provided for free or on a payment model such as a subscription, a time usage, a resource usage, bandwidth, etc. For example, users can purchase Internet connectivity in one or more different time increments. In some examples, the receiver/transmitter interface 122 can thus be available to the public and may provide Internet connectivity to users according to some free or other arrangement. Users may gain access after servicing the beehive, for example, by harvesting honey. When the computing system 120 detects that honey has been harvested, it could use the transmitter/receiver interface 122 to transmit this information to the user, using any suitable transmission protocol (e.g., WIFI).

Figure 2:
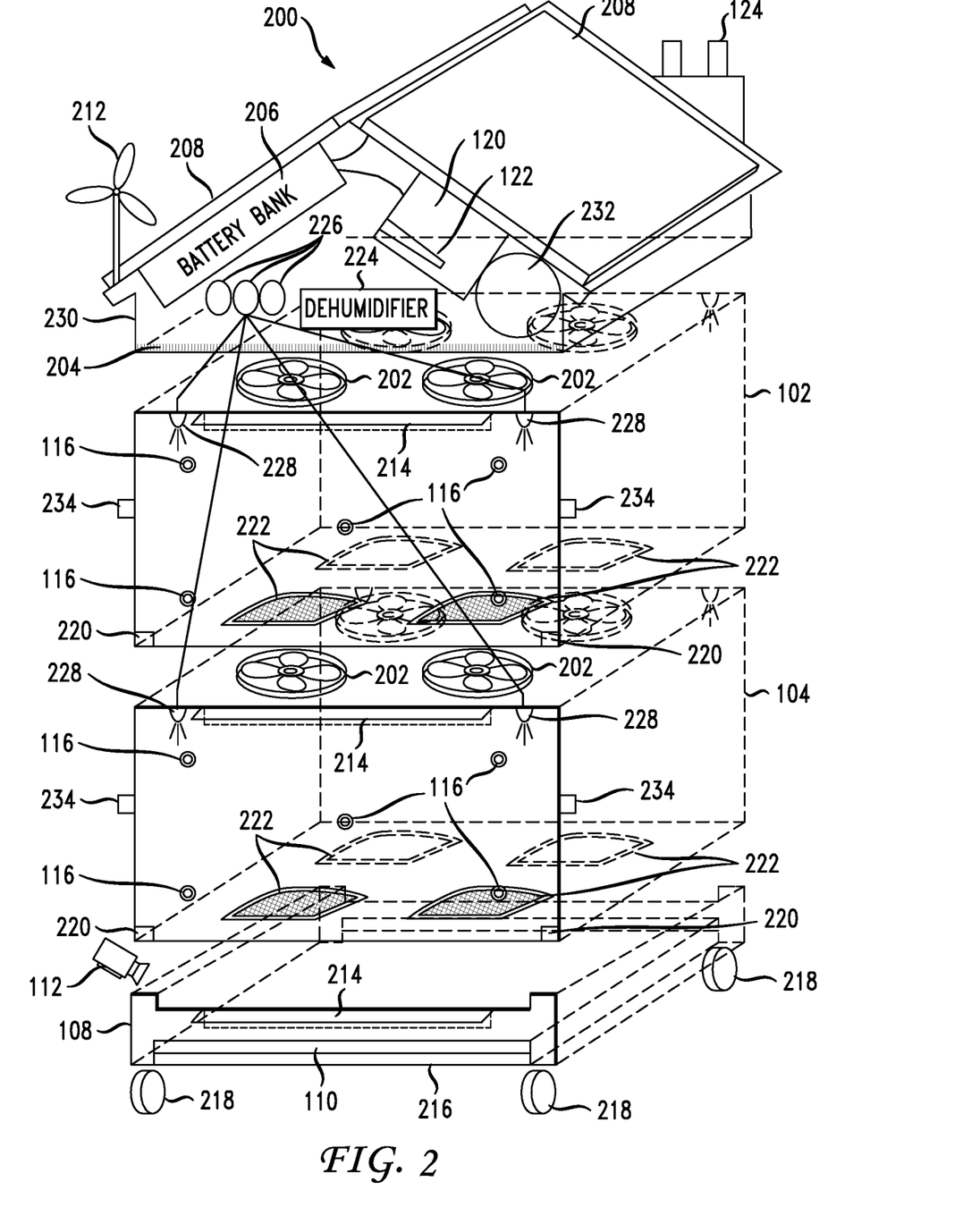
FIG. 2 illustrates another example smart beehive according to some embodiments.

FIG. 2 illustrates another example beehive 200 according to various embodiments. The beehive 200 can include boxes 102, 104, bottom portion 108, and a top cover 230. The top cover 230 can house various components and elements of the beehive 200. For example, the top cover 230 can house a battery bank 206, a dehumidifier 224, a treatment reservoir 226, an ion trap mass spectrometer 232, the computing system 120, the receiver/transmitter interface 122, etc. Although the battery bank 206, a dehumidifier 224, a treatment reservoir 226, an ion trap mass spectrometer 232, the computing system 120, the receiver/transmitter interface 122 are shown and described being configured under the top cover 230, it should be understood that the battery bank 206, a dehumidifier 224, a treatment reservoir 226, an ion trap mass spectrometer 232, the computing system 120, the receiver/transmitter interface 122 may be configured in any suitable relation to the top cover 230 without departing from the spirit and scope of the present disclosure.

The battery bank 206 can include one or more batteries for storing energy, which can be used to power the electrical components in the beehive 200. The battery bank 206 can obtain energy from a turbine 212 and/or solar panels 208. The turbine 212 and solar panels 208 can be attached to an outside of the top cover 230 for converting external wind and sunlight, respectively, into usable energy. The panels 208 can be tilted in a particular way to optimize the exposure to sunlight. In some cases, the tilt can depend on the location and surroundings of the beehive 200.

The dehumidifier 224 can be used to control the humidity levels in the beehive 200, including any of the boxes 102, 104. The dehumidifier 224 can be configured to run on a continuous basis and/or can be triggered to operate based on an event, a schedule, and/or a command. For example, the dehumidifier 224 can be at least partly controlled via the computing system 120. Here, the computing system 120 can signal the dehumidifier 224 to activate and deactivate the dehumidifier 224 at specific times or events. In some examples, the computing system 120 can obtain humidity levels from one or more sensors 116, and determine whether the humidity levels should be decreased or increased. The computing system 120 can then communicate with the dehumidifier 224 to activate or deactivate the dehumidifier 224 based on whether the humidity levels or a rate of change of humidity levels are to be increased or decreased. In this way, the computing system 120 can work with the dehumidifier 224 (or humidifier) and sensors 116 to ensure the humidity levels in the beehive 200 are maintained at a particular predefined level or within a predefined range. Optimal or preferred humidity levels can then be obtained for the bees and honeycomb in the beehive 200.

The ion trap mass spectrometer 232 can test for particular chemicals or particles in the beehive 200. For example, the ion trap mass spectrometer 232 can detect specific particles in the air. The ion trap mass spectrometer 232 can thus detect pollutants and harmful chemicals, such as pesticides, to determine if the conditions in the beehive are optimal for bee health or otherwise need to be adjusted. The ion trap mass spectrometer 232 can automatically take measurements and report the collected data to the computing system 120. The computing system 120 can analyze the data and determine if any adjustments are necessary. For example, the computing system 120 can analyze the data and detect harmful levels of a particular pollutant. In response, the computing system 120 can generate an alert to a remote user or device, and activate a component in the beehive 200, such as an air filtering component, to perform a filtering or cleansing operation. The response can be automatic based on local data and policies, or with reporting the data to a remote device, a manager may manually or automatically implement a correction.

The ion trap mass spectrometer 232 is an example system for testing, monitoring, and/or collecting chemicals or particles, such as pesticides. However, other methods or sets of methods can also be implemented in addition to, or in lieu of, the ion trap mass spectrometer 232. For examples, other methods or systems can be implemented for pesticide testing and/or collection inside and/or outside of the beehives 100, 200, such as gas chromatography, for instance.

The treatment reservoir 226 can contain chemicals and formulas which can be used to treat the bees in the beehive 200 and/or the conditions in the beehive 200. For example, the treatment reservoir 226 can include medicine for the bees in the beehive 200. Moreover, the treatment reservoir 226 can include one or more reservoirs which can include the same or different chemicals and formulas. For example, the treatment reservoir 226 can include different medicines which can be used to treat different conditions for the bees.

The treatment reservoir 226 can be connected to spray nozzles 228 in the boxes 102, 104, which can be used to deliver the contents of the treatment reservoir 226. The treatment reservoir 226 and spray nozzles 228 can be configured to periodically spray a particular chemical or formula on a schedule. The treatment reservoir 226 and spray nozzles 228 can also be configured to spray a particular chemical or formula in response to a command or signal from the computing system 120 or from a remote device. The command or signal can be based on an event or condition, such as a user request, an environmental parameter detected via the sensors 116, a policy, an algorithm, etc.

The top cover 230 can also include a mesh screen 204 at the bottom of the top cover 230. The mesh screen 204 can be placed between the top cover 230 and box 102. The mesh screen 204 can screen or filter particles and objects between the top cover 230 and box 102. For example, the mesh screen 204 can prevent certain particles from crossing from the top cover 230 to box 102. The mesh screen 204 can also prevent bees in box 102 from gaining entrance into the top cover 230.

The beehive 200 can also include one or more fans 202 for circulating air in the beehive 200. The fans 202 can be placed between the top cover 230 and box 102, between the boxes 102, 104, or other suitable location. The cooling fans 202 can operate at various times and speeds, and can be controlled by the computer system locally and/or remotely. For example, the times and/or speed of operation of the cooling fans 202 can be controlled by the computing system 120. The computing system 120 can generate signals to adjust the operation of one or more cooling fans 202 based on conditions sensed via the sensors 116. For example, if a temperature sensor detects that the temperature in the beehive 200 has exceeded a threshold, the computing system 200 can trigger one or more of the fans 202 to run. If the temperature sensor detects that the temperature in the beehive 200 has decreased below a threshold, the computing system 120 can trigger one or more fans 202 to stop or run at a lower speed. The computing system 120 can also trigger the fans 202 to run for the purpose of pushing air, chemicals, or particles out of the beehive 200 and/or dissipating pockets of air/particles.

The beehive 200 can also include one or more heating elements 222. The heating elements 222 can be configured to generate heat in order to raise the temperature in the beehive and/or boxes 102, 104. The computing system 120 can control the heating elements 222 in order to maintain the temperature in the boxes 102, 104 at a desired level or range. For example, if the computing system 120 determines, based on measurements obtained from a sensor 116, that the temperature in one or both boxes 102, 104 has fallen below a threshold, the computing system 120 can trigger one or more heating elements 222 to run and generate heat until a desired temperature or range is reached. The computing system 120 can monitor the temperature in the boxes 102, 104 using sensors 116 in order to determine when to deactivate or adjust the heating elements 222.

The beehive 202 can include one or more ventilation elements 214. The ventilation elements 214 can be ventilation flaps on the boxes 102, 104. The ventilation elements 214 can be opened or closed as needed to improve or restrict flow of air and particles between the boxes 102, 104. The ventilation elements 214 can also be closed to prevent outside elements, such as particles or chemicals, from entering the boxes 102, 104. For example, to respond to an external environmental stressor or condition, such as a pesticide, the ventilation elements 214 can close to prevent any pollutant or harmful object/particle from entering into the boxes 102, 104. The opening and closing of the ventilation elements 214 can be at least partially controlled by the computing system 120. For example, the computing system 120 can send a command to the ventilation elements 214 to open or close the ventilation elements 214 as necessary to increase or decrease the flow of air and particles into the boxes 102, 104.

The closing of the ventilation elements 214 can also be implemented based on a policy or algorithm. For example, if the vent is closed due to a detection of pesticides or because of a prediction that pesticides are about to be spread, it may be automatically closed for a certain predetermined prior of time, such as 3.0 hours. After the 3.0 hours as elapsed, a new measurement may be evaluated and if all is clear, the ventilation elements 214 may be opened. If there is the presence of a problem, the ventilation elements 214 can remain closed for another 2.0 hours, etc.

Moreover, the beehive 202 can include various types of sensors. For example, the beehive 202 can include pressure sensors 220. The pressure sensors 220 can calculate the pressure in the boxes 102, 104, and report the results to the computing system 120. The computing system 120 can monitor and track the pressure sensed by the pressure sensors 220 to determine if any adjustments are necessary.

The boxes 102, 104 can also include one or more other internal sensors 116. Non-limiting examples of sensors 116 can include temperature sensors, humidity sensors, air flow sensors, particle sensors, air quality sensors, audio, etc. The pressure sensors 220 as well as the sensors 116 can communicate with the computing system 120 to report measurements or calculated parameters. Computing system 120 can use this data to monitor conditions in the beehive 200, adjust conditions, report conditions, track events and bee health, etc.

In addition, the beehive 200 can include one or more external sensors 234. The one or more external sensors 234 can measure conditions outside of the beehive 200. For example, the external sensors 234 can detect a presence and amounts of pesticides, pollutants, carbon dioxide, carbon monoxide, and other particles or chemicals. The external sensors 234 can also detect other environmental conditions outside of the beehive 200, such as weather, temperature, wind, pressure, etc. The external sensors 234 can communicate with the computing system 120 to report measurements and data. The computing system 120 can then monitor external conditions and parameters, and activate/deactivate various components in the beehive 200 based on the particular external conditions and parameters.

A camera 112 and scale 110 can also be included in the beehive 200 as previously explained with reference to FIG. 1. Moreover, a pump 216 can be placed on the bottom portion 108.

The beehive 200 can also be equipped with wheels 218. The wheels 218 can be coupled with the bottom portion 108. The wheels 218 can allow the beehive 200 to be wheeled from one location to another.

In some examples, the beehive 200 can include an receiver/transmitter interface 122. The receiver/transmitter interface 122 can provide network and Internet connectivity to nearby wireless devices, as previously noted. The receiver/transmitter interface 122 can be positioned outside of the beehive 200 or inside of the beehive 200. For example, in some cases, the receiver/transmitter interface 122 can be placed outside of the beehive 200 (e.g., at the top or on a side). In another example, the receiver/transmitter interface 122 can reside inside of the top cover 230. Moreover, the receiver/transmitter interface 122 can be communicatively coupled to the transceiver 122 and/or the computing device 120.

In some cases, the computing device 120 and/or the transceiver 122 can be hosted on different logical networks or network segments than the receiver/transmitter interface 122 or the wireless network hosted by the receiver/transmitter interface 122. For example, the computing device 120 and/or transceiver, as well as any other computing device in the beehive 200 (other than the receiver/transmitter interface 122) capable of obtaining a network address and conducting network communications, can be configured to operate in a different local area network or virtual local area network (VLAN) than the receiver/transmitter interface 122 and any devices connected to the receiver/transmitter interface 122. To illustrate, the computing device 120 and the transceiver can be assigned to VLAN 10 and the receiver/transmitter interface 122—as well as any device that obtains connectivity via the receiver/transmitter interface 122—can be assigned to VLAN 20 in order to segregate communications via the receiver/transmitter interface 122 and communications via the computing device 120 and the transceiver 122. This can protect the data and communications associated with the computing device 120 and transceiver 122 from devices that connected to the receiver/transmitter interface 122.

For example, if the receiver/transmitter interface 122 is configured to provide public WIFI access, the receiver/transmitter interface 122 and wireless network hosted by the receiver/transmitter interface 122 can be designated to a separate, segregated network or network segment to prevent or limit users who connect to the receiver/transmitter interface 122 for WIFI from being able to access the data associated with the computing device 120 and the transceiver. This network segregation can also prevent or limit public users from being able to connect to or even controlling the transceiver 122, the computing device 120, or any other electronic device in the beehive 200. Other security mechanisms, such as firewall and/or content filtering services can be employed to prevent users connecting through the receiver/transmitter interface 122 from accessing and/or controlling electronic devices or components in the beehive 200, such as the computing device 120, the transceiver 122, and/or any sensors, solar panels, sprays, fans, heating elements, cameras, pumps, etc.

In some cases, the beehive 200 may contain multiple access points 124. For example, the beehive 200 may include an receiver/transmitter interface 122 configured to host a public wireless network (e.g., a WIFI network accessible by the public and/or subscribed users), and a separate receiver/transmitter interface 122 configured to host a private wireless network which can be secure and accessible only by authorized users, such as an administrator or owner of the beehive 200.

The beehives 100, 200 illustrated in FIGS. 1 and 2 are described as the stackable box style of beehives. This structure or configuration is a non-limiting example provided for the sake of clarity and explanation. Indeed, other structures or configurations are also contemplated herein. For example, in some configurations, the beehives 100, 200 can have a top bar structure or configuration. The top bar configuration includes horizontal beehives with a trough orientation. In some examples, the top bar beehive can be a single-story frameless beehive in which the comb hangs from the removable bars.

Moreover, in some examples, the beehives 100 and/or 200 can include a queen catch (not shown). The queen catch can be a compartment, such as a plastic compartment, integrated in the beehive 100 and/or 200. With the queen catch, the queen can be lured in with pheromones, or automatically captured based on a trigger from weight, size, and/or queen mandibular pheromone, as the queen is larger than each of the other bees and has a unique smell. The queen can be closed in for a period (e.g., 3-7 days), thus causing a break in the brood pattern during which eggs are not laid. This break in egg laying then results in a dramatic drop in *Varroa* mite infestation. *Varroa* mites reproduce alongside bee brood, such that when no bee reproduction occurs, no *Varroa* reproduction occurs. This can be an organic method of curing *Varroa* infestation. In some cases, the beehives 100 and/or 200 can do this automatically, while notifying the beekeeper that the queen is caged and subsequently released.

Figure 3:
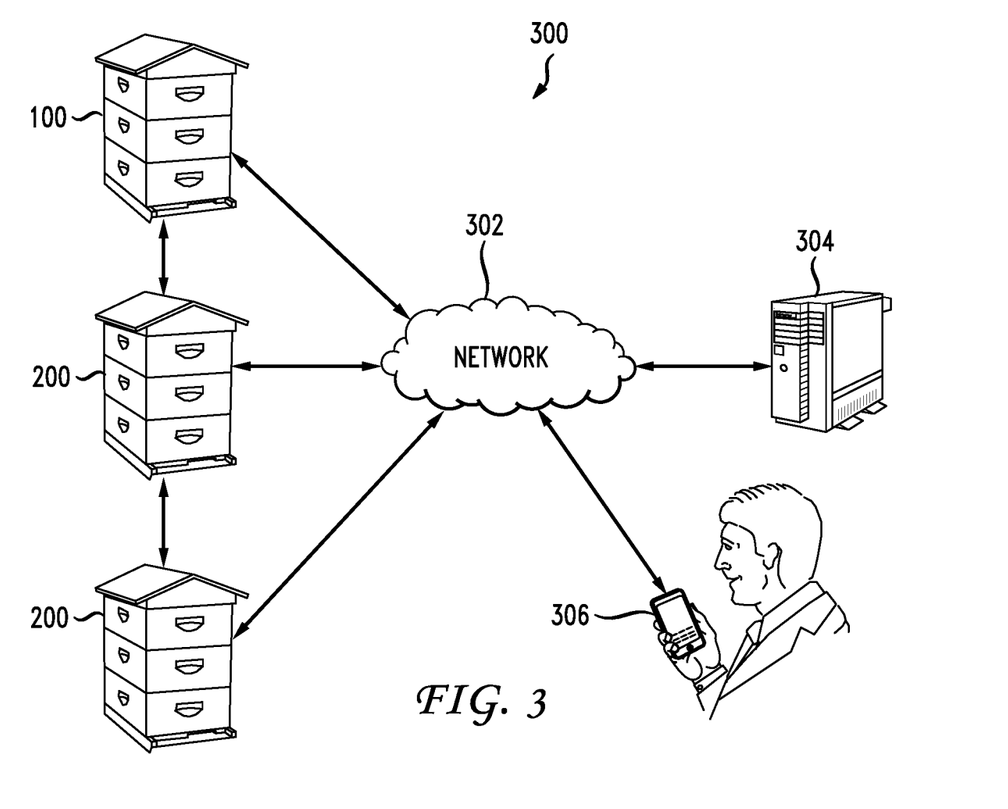
FIG. 3 illustrates an example beehive monitoring and management system according to some embodiments.

FIG. 3 illustrates an example beehive monitoring system 300. The system 300 can include one or more beehives 100, 200. The beehives 100, 200 can communicate with remote systems 304, 306 via a network 302. The beehives 100, 200 can connect to the network via the receiver/transmitter device 122 using any wireless or wired protocols and media, such as Bluetooth, WIFI, TCP/IP, cellular, etc.

The network 302 can include a public network, such as the Internet, and/or a private network, such as a local area network (LAN). Moreover, the remote systems 304, 306 can include one or more servers, computers, laptops, smartphones, tablet computers, etc. In some cases, the remote system 304 can be a cloud computing environment and/or a network datacenter, for example.

The remote systems 304, 306 can receive data from the computing system 120 in the beehives 100, 200. The data can include alerts, notifications, measured parameters or conditions (e.g., temperature, humidity, pressure, air flow levels, pesticide levels, etc.), operating conditions of various components (e.g., current operating mode of heating elements 222, fans 202, ventilation elements 214, sensors 116, solar panels 208, sprays 228, dehumidifier 224, mass spectrometer 232, battery 206, etc.), statistics, etc.

The remote systems 304, 306 can also send signals and commands to the computing system 120 to trigger operations by the computing system 120 or any of the components in the beehives 100, 200. For example, the remote systems 304, 306 can monitor environment conditions in the beehives 100, 200 (e.g., temperature, humidity, air flow, pressure, sound, etc.), and generate an instruction or command to the computing system 120 to modify the operation (e.g., activate, deactivate, etc.) of one or more components in the beehives 100, 200. This can allow the beehives 100, 200 to be monitored and controlled remotely from the remote systems 304, 306. A graphical interface on system 304,306 can show the manager an aggregated status of beehives as a group or individual status of respective beehives. The individual status can be shown by a "drill down" click on the interface.

Figure 4:
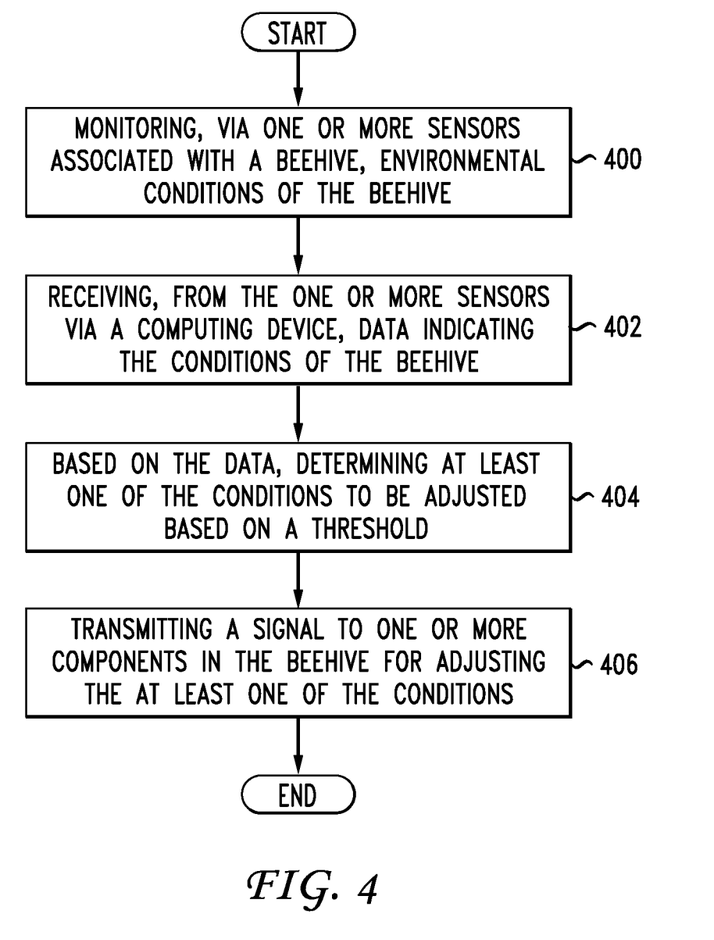
FIG. 4 illustrates an example method embodiment.

FIG. 4 illustrates an example method embodiment. At step 400, the sensors 116 can monitor environmental conditions of the beehive 200. For example, the sensors 116 can measure various environmental conditions or parameters in the beehive 200. The conditions or parameters can include, for example, a temperature in the boxes 102, 104; an airflow in the boxes 102, 104; a humidity level in the boxes 102, 104; a pressure level in the boxes 102, 104; a rate of ventilation in the boxes 102, 104; an air quality in the boxes 102, 104; etc.

The sensors 116 can measure or monitor the conditions or parameters continuously, on a schedule, and/or based on a triggering event, such as an instruction from the computing system 120. The timing and amount of measurements can also vary by the sensors. For example, a temperature sensor may take more frequent measurements than a pressure sensor, or vice versa. Thus, the schedule and/or frequency of measurements can vary for different sensors. Moreover, the triggering event can vary for different sensors.

At step 402, the computing system 120 can receive, from the sensors 116, data indicating the conditions of the beehive. The data can include any measurements taken by the sensors 116. The data can also include certain metadata, such as a timestamp or information about the sensor associated with the data (e.g., location of sensor, type of sensor, status of sensor, etc.). The computing system 120 can receive the data from the sensors 116 on a schedule, by request, and/or automatically as data is obtained/generated by the sensors 116.

The computing system 120 can analyze, store, and/or report the data received from the sensors 116. For example, the computing system 120 can analyze the data to determine the current conditions in the beehive and determine whether any conditions should be adjusted.

At step 404, the computing system 120 can determine a condition of the beehive to be adjusted based on a threshold. For example, the computing system 120 can determine if any particular condition exceeds a threshold or falls outside of a threshold range/limit. To illustrate, the computing system 120 can determine if the temperature in the beehive is below a certain minimum temperature specified for the bees and the beehive, or above a certain maximum temperature specified for the bees and the beehive. As another example, the computing system 120 can determine if humidity levels, pressure levels, pollution levels, or any other parameters are abnormal or out of range. The condition can also be a rate of change of any parameters or a correlation of data for any two or more parameters.

At step 406, the computing system 120 can transmit a signal to one or more components in the beehive for adjusting the condition that has exceeded its specified limits. In other words, the computing system 120 can transmit a command or instruction to one or more components to adjust an operation or status of the one or more components in order to adjust the condition as desired. For example, if the computing system 120 determines that a temperature in the beehive has fallen below a threshold, the computing system 120 can send a signal to one or more heating elements 222 to activate the heating elements 222 in order to generate more heat in the beehive. This way, the computing system 120 can automatically adjust the temperature in the beehive when necessary to maintain optimal conditions for the beehive.

The computing system 120 can control the various components in the beehive to monitor and maintain specific conditions in the beehive. For example, the computing system 120 can determine if a treatment or medicine for the bees is necessary or desired, and automatically activate the spray nozzles 228 to distribute or deliver the desired treatment or medicine for the bees. The computing system 120 can also control ventilation elements 214 to control the flow of air and particles in and out of the beehive. For example, if the computing system 120 determines, based on data obtained from a sensor, that pesticide levels or pollutant levels outside of the beehive have increased or exceeded a threshold, the computing system 120 can automatically close one or more ventilation elements 214 to prevent outside air and particles from entering the beehive.

The computing system 120 can continue to obtain data from the sensors 116 to monitor the various parameters (e.g., temperature, humidity, pressure, air flow, air quality, etc.), and control the various components in the beehive in order to influence the various parameters and maintain the various parameters within a particular threshold or range.

The computing system 120 can also communicate data, alerts, notifications, conditions, status information, etc., with remote systems 304, 306 to allow for remote management, monitoring, and control of the beehive. The computing system 120 can also receive data and commands from the remote systems 304, 306 to control the various components in the beehive. This way, users can monitor, control, and manage the beehive, including any of its components, remotely from any device.

The monitoring and management process can also be automated to limit the user's involvement. For example, specific parameters and conditions can be defined in the computing system 120 and/or remote systems 304, 306, to allow for automated monitoring and detection of abnormal parameters or conditions. The parameters and conditions defined in the computing system 120 and/or remote systems 304, 306 can include rules and thresholds for determining when a condition should be identified, and when a condition should trigger an action, such as an alert or a command to adjust the operation of one or more components. It is noted that if several conditions exist that need addressing, such as pesticides and low temperature in the beehive, that a disambiguation algorithm can prioritize the actions so that preventative measures do not occur simultaneously that could be troublesome. For example, if vents are to be closed while the beehive also needs air flow, then a policy or algorithm can be referenced and applied to analyze the situation and prioritize or order the actions to take place. The ordering could also adjust the timing of how long each action takes place. In other words, there may be an adjustment to one or more actions of a group of correlated actions.

Figure 5A:
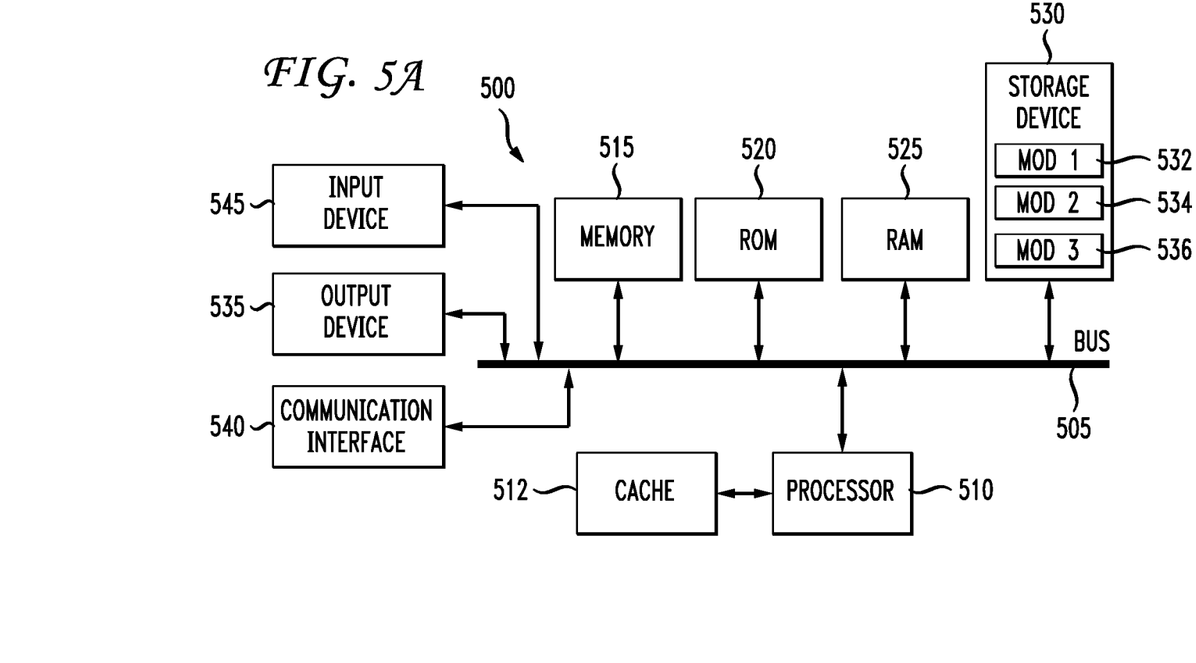
FIGS. 5A and 5B illustrate example system embodiments.
Figure 5B:
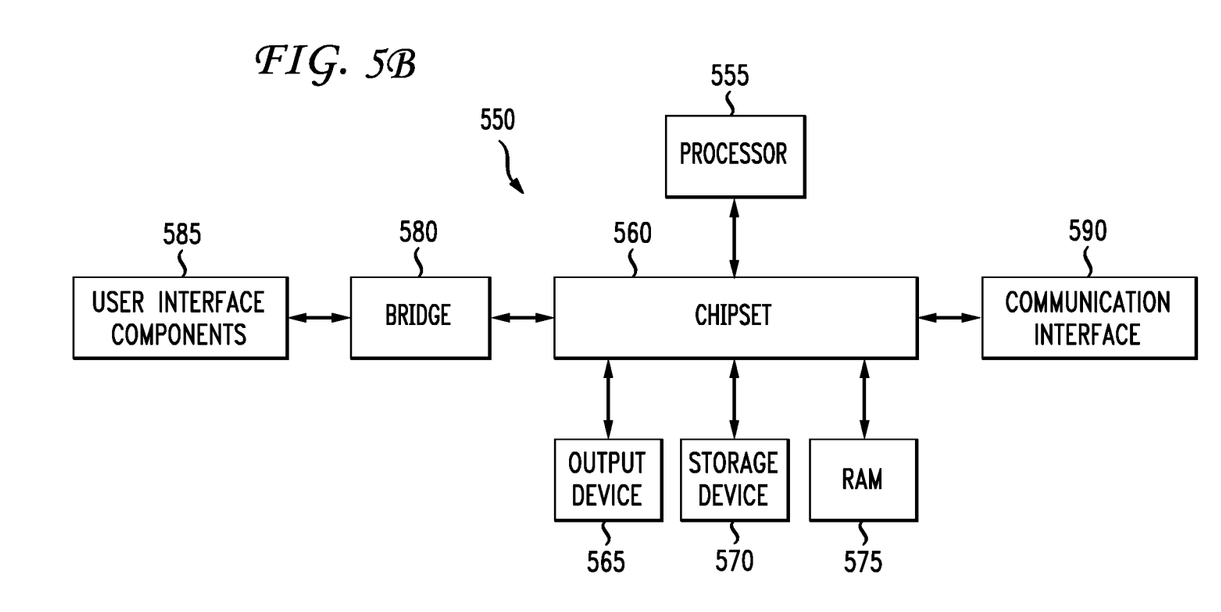

The disclosure now turns to FIGS. 5A and 5B, which illustrate example architectures for a computing system, such as computing system 120.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates an example computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output device 565, such as a display, and can read and write information to storage device 550, which can include magnetic media, and solid state media, for example. Chipset 560 can also read data from and write data to RAM 555. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 550 or 555. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A beehive comprising:
   a computing device having at least one processor;
   a ventilation flap;
   an entrance flap;
   one or more sensors;
   a receiver/transmitter device coupled with the computing device; and
   at least one memory that stores instructions that are executed by the at least one processor to:
      receive signals from the one or more sensors, wherein the one or more sensors comprise an ion trap mass spectrometer or a humidity detector;
      adjust the ventilation flap associated with airflow through the beehive according to the signals received from the one or more sensors;
      transmit the signals to a remote computing device using the receiver/transmitter device; and
      automatically close the entrance flap for a predetermined period of time in response to a condition sensed by the one or more sensors.

2. The beehive of claim 1, wherein the one or more sensors comprises a temperature sensor, and wherein the at least one memory stores additional instructions which, when executed by the at least one processor, cause the at least one processor to receive a signal from the temperature sensor, and adjust a heating element to control a temperature inside the beehive.

3. The beehive of claim 1, wherein the at least one memory stores additional instructions which, when executed by the at least one processor, cause the at least one processor to control a treatment reservoir for introducing a material into the beehive.

4. The beehive of claim 1, wherein the one or more sensors comprises a temperature sensor, and wherein the at least one memory stores additional instructions which, when executed by the at least one processor, cause the at least one processor to receive a signal from the temperature sensor, and adjust one or more fans to control a temperature inside the beehive.

5. The beehive of claim 1, wherein the at least one memory stores additional instructions which, when executed by the at least one processor, cause the at least one processor to receive a signal from the humidity detector, and adjust at least one of a dehumidifier or a humidifier to control a humidity level inside the beehive.

6. The beehive of claim 1, wherein a treatment spray element is configured to release, into a first box, a bee treatment material contained in a treatment reservoir in response to a triggering event, the triggering event comprising at least one of a predetermined period of time, a signal from the computing device, and a condition sensed by the one or more sensors.

7. The beehive of claim 1, wherein an upper portion of the beehive further comprises a mesh screen, the mesh screen being positioned over at least part of a bottom opening of the upper portion, the bottom opening providing access to an inside of a first box through an upper opening in the first box.

8. The beehive of claim 1, wherein the at least one memory stores additional instructions which, when executed by the at least one processor, cause the at least one processor to receive a signal from a scale that measures a weight of the beehive, and transmit the weight to the remote computing device.

9. The beehive of claim 8, wherein the sensed condition comprises a threshold level of pesticide.

10. The beehive of claim 8, wherein the at least one memory stores additional instructions which, when executed by the at least one processor, cause the at least one processor to receive an image from a camera, and transmit the image to the remote computing device.

11. The beehive of claim 1, wherein the one or more sensors are configured to monitor and report, to the remote computing device, conditions of a first box comprising at least one of a temperature, an airflow, a humidity level, a pressure, and a rate of ventilation.

12. The beehive of claim 6, wherein the at least one memory stores additional instructions which, when executed by the at least one processor, cause the at least one processor to obtain conditions of the first box and, in response, signal one or more components in the beehive to perform an action configured to adjust the conditions in the first box to yield adjusted conditions, the adjusted conditions comprising at least one of an adjusted temperature, an adjusted airflow, an adjusted humidity level, an adjusted pressure, an adjusted rate of ventilation, and an adjusted composition of particles.

13. The beehive of claim 12, wherein the one or more components comprise at least one of the ion trap mass spectrometer, the treatment spray element, a heating element, a ventilation fan, the ventilation flap, an external sensor, and the one or more sensors, and wherein the computing device is configured to perform at least one of:
transmit, via the receiver/transmitter device, data corresponding to the conditions to a remote device; and
receive, via the receiver/transmitter device from the remote device, a signal for signaling the one or more components in the beehive to perform the action.

14. A method of operating a beehive, the method comprising:
receiving, using instructions stored in a memory and executed by a processor, signals from one or more sensors, wherein the one or more sensors comprise an ion trap mass spectrometer or a humidity detector;
adjusting, using the instructions, a ventilation flap associated with airflow through the beehive according to the signals received from the one or more sensors;
transmitting, using the instructions, the signals to a remote computing device via a receiver/transmitter device; and
automatically closing an entrance flap on the beehive for a predetermined period of time response to a condition sensed by the one or more sensors.

15. The method of claim 14, further comprising receiving a signal from a temperature sensor, and adjusting a heating element to control a temperature inside the beehive.

16. The method of claim 14, further comprising controlling a treatment reservoir for introducing a material into the beehive.

17. The method of claim 14, further comprising receiving a signal from a temperature sensor, and adjust one or more fans to control a temperature inside the beehive.

18. A computer-readable storage device having stored therein instructions which, when executed by a processor, cause the processor to perform operations comprising:
receiving signals from one or more sensors associated with a beehive, wherein the one or more sensors comprise an ion trap mass spectrometer or a humidity detector;
adjusting a ventilation flap associated with airflow through the beehive according to the signals received from the one or more sensors;
transmitting the signals to a remote computing device via a receiver/transmitter device; and
automatically closing an entrance flap for a predetermined period of time in response to a condition sensed by the one or more sensors.

* * * * *